United States Patent [19]

Shedigian

[11] Patent Number: 4,476,516

[45] Date of Patent: Oct. 9, 1984

[54] DIELECTRIC FLUID FOR ELECTRICAL CAPACITORS

[75] Inventor: Vandos Shedigian, Indianapolis, Ind.

[73] Assignee: Emhart Industries, Inc., Indianapolis, Ind.

[21] Appl. No.: 544,698

[22] Filed: Oct. 24, 1983

[51] Int. Cl.³ .............................................. H01G 4/22
[52] U.S. Cl. .................................... 361/315; 252/567; 361/319
[58] Field of Search ............... 361/314, 319, 315, 327; 252/567, 578, 579, 570

[56] References Cited

U.S. PATENT DOCUMENTS

| 3,724,043 | 4/1973 | Eustance ................. 252/567 X |
| 4,348,713 | 9/1982 | Grahame ................. 361/314 X |
| 4,420,791 | 12/1983 | Shedigian ............... 361/327 X |

Primary Examiner—Donald A. Griffin
Attorney, Agent, or Firm—Robert F. Meyer

[57] ABSTRACT

Isopropyl biphenyl is used as a dielectric fluid for a-c electrical capacitors. An additive of an epoxide having the chemical name 3,4-epoxycyclohexylmethyl-3,4-epoxycyclohexane carboxylate in an amount of at least 30% by volume of the dielectric fluid increases its dielectric constant.

6 Claims, 3 Drawing Figures

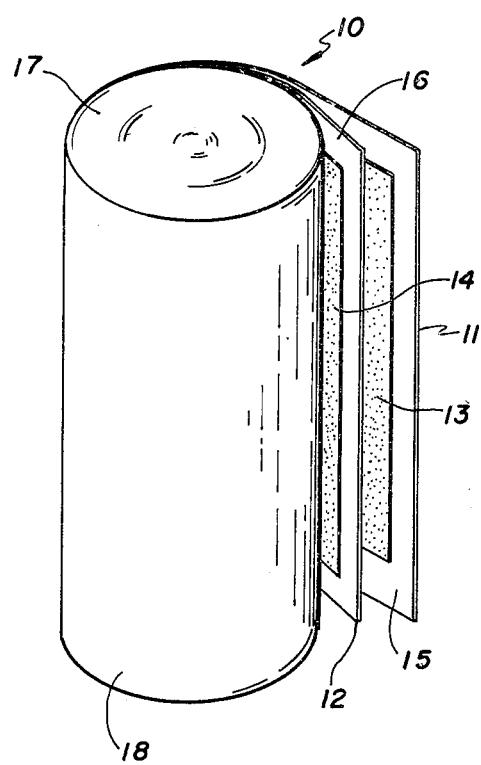
FIG. 1
FIG. 2
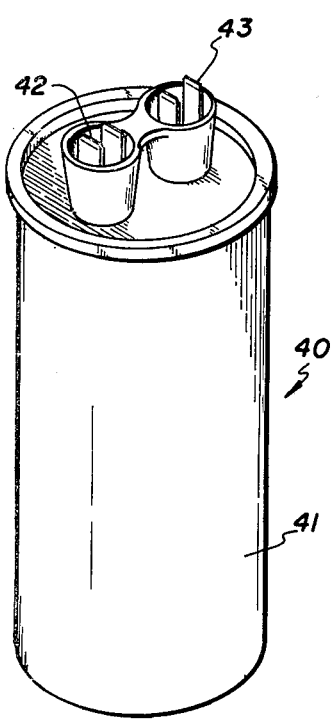
FIG. 3

DIELECTRIC FLUID FOR ELECTRICAL CAPACITORS

BACKGROUND OF THE INVENTION

This invention relates to a dielectric liquid impregnant for electrical devices and more particularly to an electrical capacitor utilizing an improved dielectric liquid impregnant.

Liquid impregnants for electrical capacitors should have a high dielectric constant, maintain a low dissipation factor, and be compatible with other materials utilized in the capacitor structure. At the same time, the impregnant must withstand elevated and fluctuating temperature, pressure, and voltage stress conditions with excellent electrical characteristics for a long operative life of the capacitor.

The polychloroinated biphenyls as capacitor impregnants meet these requirements and they were eminently satisfactory for several decades. The polychlorinated biphenyls are broadly referred to as PCBs. The polychlorinated biphenyls have recently been associated with ecological problems, restrictive use limitations, and rising costs. These problems have spurred the search for a suitable replacement capacitor impregnant which would have some advantageous impregnant characteristics comparable to those of the chlorinated biphenyls, and still provide outstanding electrical and compatibility performance with the two most important present day capacitor solid dielectrics, paper and polypropylene. Isopropyl biphenyl (IPB) has been suggested as providing good electrical characteristics as a dielectric fluid impregnant.

PRIOR ART

U.S. Pat. No. 4,054,937 teaches the use of isopropyl biphenyl in power correction capacitors.

U.S. Pat. No. 3,948,788 teaches the use of isopropyl biphenyl in sulfones as a dielectric fluid for capacitors.

U.S. Pat. No. 4,320,034 teaches that with the addition of isopropyl diphenyl fo methyl diphenyl ethane discharge inception voltage (DIV) is improved.

U.S. Pat. No. 4,348,713 teaches the addition of mono isopropyl biphenyl into di-2-ethyl-hexyl phthalate (DEHP) to reduce the impregnation time of capacitors and that the partial discharge (corona) intensity of the capacitor is improved as compared to DEHP.

However, one of the problems of using IPB is its dielectric constant which has been found to be roughly two times less than that of PCBs.

FEATURES OR OBJECTS OF THE INVENTION

It is, therefore, a feature of the invention to increase the dielectric constant of IPB as used in a capacitor. Another feature of the invention is to provide a capacitor having a dielectric fluid of IPB with an epoxide additive of at least 30% by volume of the total volume of fluid to increase the dielectric constant of the IPB. These and other features of the invention will become apparent from the following description taken in conjunction with the accompanying drawings.

SUMMARY OF THE INVENTION

Generally speaking, the present invention pertains to a capacitor having a dielectric fluid which includes IPB and an additive of the epoxide 3,4-epoxycyclohexyl-methyl-3,4-epoxycyclohexane carboxylate in an amount of from 30–90% by volume of the total volume of the fluid.

BRIEF DESCRIPTION OF THE DRAWINGS

FIG. 1 of the drawing illustrates a convolutely wound a-c capacitor body partially unwound to show the dielectric plastic film and foil electrode structure.

FIG. 2 of the drawing illustrates the convolutely wound a-c capacitor body of FIG. 1 to which leads are attached.

FIG. 3 of the drawing illustrates the a-c capacitor body suitably encased and sealed in a housing.

DISCUSSION OF THE INVENTION

Referring now to FIG. 1 of the drawing, there is illustrated a convolutely wound a-c capacitor body 10. The capacitor body 10 includes a pair of dielectric film layers 11 and 12 and overlying electrodes 13 and 14, respectively. Electrodes 13 and 14 are of a suitable metal such as aluminum for example. Margins 15 and 16 are provided for preventing electrical short circuit between the electrodes. As shown in FIG. 2, suitable terminal leads 23 and 24 are attached to the electrodes 13 and 14 from opposite ends 21 and 22 of the capacitor body 10. Suitable lead material could be solder coated copper for example.

The dielectric plastic films or layers 11 and 12 should have high dielectric strength, low dissipation factor to prevent thermal runaway, broad temperature range capabilities, resistance to the dielectric fluid, and freedom from pinholes and conductive particles. Suitable dielectric film layers 11 and 12 may be paper, a paper and polymeric film combination, or polymeric films.

In FIGS. 2 and 3, a capacitor body 10 is preferably sealed to a can or housing 40 to form a capacitor 41. Capacitor 41 includes the metal housing or can 40 and terminals 42 and 43. The capacitor body 10 is contained within the housing 40 and terminal lead 23 makes electrical contact with terminal 42 and the remaining terminal lead 24 makes electrical contact with terminal 43.

As noted previously, fluid or liquid dielectric impregnants for electrical capacitors should have a high dielectric constant, maintain a low dissipation factor and be compatible with the other materials used in capacitor structure. According to the present invention, the dielectric fluid which is used to impregnate the capacitor body 10 satisfies all but one of these requirements, that being a high dielectric constant. The dielectric fluid of the present invention includes isopropyl biphenyl with an epoxide additive to materially increase the dielectric constant. The epoxide additive according to the invention is that of 3,4-epoxycyclohexylmethyl-3,4-epoxycyclohexane carboxylate (ERL-4221) having the formula:

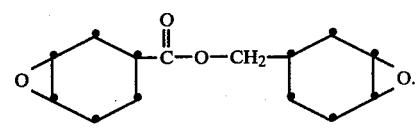

Such compound (ERL-4221) is sold in commercial quantities by Union Carbide Corporation under the brand name Bakelite Cycloaliphatic Epoxide.

Epoxides have been known for years as acid scavengers and conductive ion traps as well as having the ability to clean up thermal, chemical, and electrical decompositions within capacitors during operation. In practice up to 1% of the epoxide by volume of the fluid is added. However, under such circumstances the dielectric constant of the fluid is not appreciably increased. According to the present invention the epoxide additive of the above-noted formula is added in the amount of 30-90% by volume of the total volume of the fluid.

When used as an additive in a dielectric fluid for capacitors of the type described in FIGS. 1-3, the additive is mixed as a liquid with liquid IPB, refined through a chromatographic column using Fuller's Earth or aluminum oxide and then impregnated into the capacitors.

Two sets of paper capacitors of the type shown in FIGS. 1-3 and rated 370 VAC/25 uF were impregnated with IPB as the dielectric fluid. An additive of 0.5% ER-4221 by volume of the total fluid was added to one set and 30% to the other set. Both sets included an additive of butylated hydroxytolune in an amount of 0.1% vol/wt of the total volume of fluid as an antioxidant. The two sets were life tested for 1,000 hours at 80° C., which is 25% above design stress temperature. Table I results clearly show that when 30% ERL-4221 by total volume is added there is increased capacitance, indicating an increase in its dielectric constant.

TABLE I

Electrical Capacitor Properties
Capacitance and % Dissipation Factor Stability
During Life Test
370 VAC/25UF Capacitors on 495 VAC
80° C. Life Test
Dielectric-2 × 0.40 Mils + 2 × 0.45 Mils Paper

| Fluid | IPB Initial | 70% IPB + 30% ERL-4221 Initial | IPB 1000 Hrs. | 70% IPB + 30% ERL4221 1000 Hrs. |
|---|---|---|---|---|
| | | Capacitance-uF | | |
| 25° C. | 20.06 | 23.84 | 20.05 | 23.86 |
| 60° C. | 19.99 | 23.44 | 20.01 | 23.48 |
| 80° C. | 20.01 | 23.38 | 20.02 | 23.41 |
| | | Dissipation Factor (%) | | |
| 25° C. | .222 | .298 | .242 | .401 |
| 60° C. | .219 | .272 | .190 | .330 |
| 80° C. | .226 | .239 | .204 | .269 |

What is claimed is:

1. In a capacitor, a dielectric fluid comprising isopropyl biphenyl and an additive of at least 30% by volume of the total volume of said dielectric fluid of an epoxide 3,4-epoxycyclohexylmethyl-3,4 epoxycyclohexane carboxylate.

2. In a capacitor according to claim 1 wherein said additive is in an amount of from 30-90% by volume of the total volume of said dielectric fluid.

3. In a capacitor according to claim 2 wherein said additive is in an amount of about 30% by volume of the total volume of said dielectric fluid.

4. A method of increasing the capacitance of capacitors having a dielectric fluid of isopropyl biphenyl comprising adding an epoxide additive of 3,4-epoxycyclohexylmethyl-3,4-epoxycyclohexane carboxylate in an amount of at least 30% by volume of the total volume of said dielectric fluid.

5. A method according to claim 4 wherein said epoxide additive is in an amount of from 30-90% by volume of the total volume of said dielectric fluid.

6. A method according to claim 5 wherein said epoxide additive is in an amount of about 30% by volume of the total volume of said dielectric fluid.

* * * * *